United States Patent [19]

Yoshimura et al.

[11] Patent Number: 4,808,395
[45] Date of Patent: Feb. 28, 1989

[54] HIGH-QUALITY COLORING CARBON BLACK AND PROCESS FOR ITS PRODUCTION

[75] Inventors: Shushichi Yoshimura; Makoto Ishizu, both of Kitakyushu; Hiromu Kobayashi, Yokohama; Hozo Yamazaki, Kitakyushu, all of Japan

[73] Assignee: Mitsubishi Chemical Industries Limited, Tokyo, Japan

[21] Appl. No.: 943,491

[22] Filed: Dec. 19, 1986

[30] Foreign Application Priority Data

Dec. 26, 1985 [JP] Japan .............................. 60-296134

[51] Int. Cl.$^4$ .............................................. C08K 3/04
[52] U.S. Cl. .................. 423/447.3; 423/447.7; 423/456; 106/472
[58] Field of Search ............... 106/307, 472; 423/445, 423/447.3, 447.7, 456

[56] References Cited

U.S. PATENT DOCUMENTS 4,035,336  7/1977  Jordan et al. .................. 106/307
4,366,138  12/1982 Eisenmenger et al. ........... 106/307
4,684,560  8/1987  Minten et al. .................. 106/307

Primary Examiner—Amelia Burgess Yarbrough
Attorney, Agent, or Firm—Oblon, Fisher, Spivak, McClelland & Maier

[57] ABSTRACT

High-quality coloring carbon black having a specific surface area ($S_{BET}$), an area average diameter ($D_a$) and a pore volume ($AV_{Hg}$) which make both the roughness factor (RF) and aggregate factor (AF) as calculated by the following equations, negative values:

$$RF = S_{BET} - 28710/(D_a) + 1450$$

$$AF = AV_{Hg} + 14 \times (D_a) - 290$$

where $S_{BET}$ is the specific surface area (m$^2$/g) of the carbon black as measured by a BET nitrogen absorption method, $D_a$ is the area average diameter (m$\mu$m) of the carbon black as measured by an electron microscopic measuring method, and $AV_{Hg}$ is the pore volume (cc/100 g) of the carbon black as measured by a mercury porosimeter, provided $D_a$ is at most 17 m$\mu$m.

4 Claims, 1 Drawing Sheet

HIGH-QUALITY COLORING CARBON BLACK AND PROCESS FOR ITS PRODUCTION

The present invention relates to novel high-quality coloring carbon black useful as a black-coloring agent to be employed as a pigment for rubbers, paints, lacquers, inks, or resins, and a process for its preparation.

In general, so-called high-quality coloring carbon black having excellent blackness with a small particle size among coloring carbon blacks has heretofore been produced by a channel method, because carbon black obtainable by a furnace method has a large particle size and does not have excellent blackness, and it has a large surface roughness, whereby the color tone is inferior.

However, the channel method is costly and involves an environmental pollution problem, and its use is diminishing. In recent years, there have been some attempts to produce high-quality coloring carbon black by the furnace method, but none of them is fully satisfactory for the production of carbon black having desired properties.

Under the circumstances, the present inventors have conducted extensive researches to develop novel high-quality coloring carbon black on the basis that the properties of the coloring carbon black are determined by the particle size, structure, surface condition, etc. As a result, it has been found impossible to adequately satisfy the requirements for various properties such as blackness, color tone and dispersibility, simply by decreasing the particle size of the carbon black.

From a further study, it has been found that excellent blackness and color tone are obtainable when, as the physical properties of the carbon black obtained, the area average diameter ($D_a$) as measured by an electron microscopic measuring method is at most a certain level, and the roughness factor (RF) as a function of the area average diameter ($D_a$) and the specific surface area ($S_{BET}$), i.e. the surface roughness of the carbon black, is at most a certain level, and that the excellent dispersibility is obtainable when the aggregate factor (AF) as a function of the above average diameter ($D_a$) and the pore volume ($AV_{Hg}$) as measured by a mercury polosimeter, i.e. the degree of aggregation of carbon black, is at most a certain level. Further, it has been found that carbon black satisfying such physical properties, can readily be obtained by heat treatment at a high temperature in a short period of time. The present invention has been accomplished on the basis of these discoveries.

Namely, the object of the present invention is to provide novel high-quality coloring carbon black having excellent blackness, color tone and dispersibility, and a process for readily producing such carbon black.

Thus, the present invention provides high-quality coloring carbon black having a specific surface area ($S_{BET}$), an area average diameter ($D_a$) and a pore volume ($AV_{Hg}$) which make both the roughness factor (RF) and aggregate factor (AF) as calculated by the following equations, negative values:

$$RF = S_{BET} - 28710/D_a + 1450$$

$$AF = AV_{Hg} + 14 \times (D_a) - 290$$

where $S_{BET}$ is the specific surface area (m²/g) of the carbon black as measured by a BET nitrogen absorption method, $D_a$ is the area average diameter (mμm) of the carbon black as measured by an electron microscopic measuring method, and $AV_{Hg}$ is the pore volume (cc/100 g) of the carbon black as measured by a mercury porosimeter, provided $D_a$ is at most 17 mμm.

Such carbon black can readily be obtained by a process for producing high-quality coloring carbon black in a reaction system comprising a first zone where an oxygen-containing gas and a fuel are mixed, and a high temperature combustion gas stream is formed, and a second zone, as a down-stream zone subsequent to the first zone, where a hydrocarbon starting material is mixed to the high temperature combustion gas thus obtained, to form carbon black, and then the carbon black-forming reaction is terminated, wherein a constricted portion is provided in the second zone to impart turbulence to the high temperature gas stream during the formation of carbon black, the flow rate of the high temperature gas stream at the outlet of the constricted portion is adjusted to be from 350 to 650 m/sec, the temperature in the second zone is adjusted to be from 1700° to 1980° C., and the retention time is adjusted to be from 1 to 40 millisecond.

Now, the present invention will be described in detail with reference to the preferred embodiments.

In the accompanying drawings, FIG. 1 is a vertical cross sectional view of the apparatus employed in the Examples of the present invention.

Figure 1:
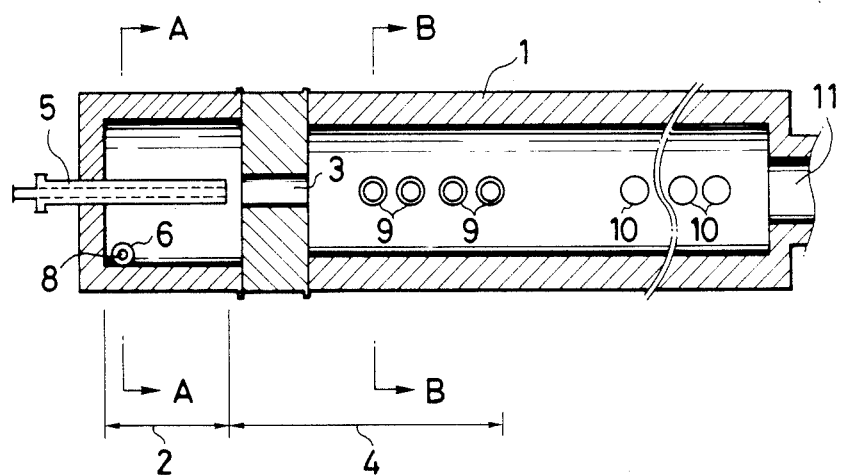
Figure 2:
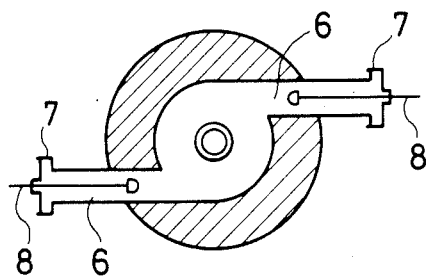
FIG. 2 is a cross sectional view taken along line A—A in FIG. 1.
Figure 3:
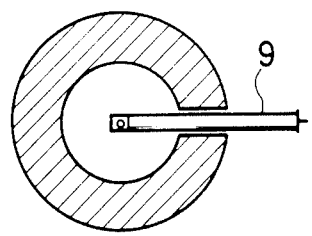
FIG. 3 is a cross sectional view taken along line B—B in FIG. 1.

In the Figures, reference numeral 1 indicates a cylindrical refractory brick, numeral 2 indicates a first zone, numeral 3 indicates a constricted portion, numeral 4 indicates a second zone, numeral 5 indicates a hydrocarbon starting material supply nozzle, numeral 6 indicates a high temperature combustion gas inlet, numeral 7 indicates an oxygen-containing gas inlet, numeral 8 indicates a fuel supply nozzle, numeral 9 indicates a water spray tube for terminating the reaction, numeral 10 indicates a cooling water spray, and numeral 11 indicates a flue.

The carbon black of the present invention has excellent coloring properties such as blackness, color tone and dispersibility, and is carbon black having an area average diameter ($D_a$), a specific surface area ($S_{BET}$) and a pore volume ($AV_{Hg}$) which make both the roughness factor (RF) and aggregate factor (AF) as specified in the present invention, negative values, and the area average diameter ($D_a$) as measured by an electron microscopic measuring method, is at most 17 mμm, preferably at most 15 mμm.

Here, the roughness factor (RF) is defined by the following equation (1) and represents an index showing the surface roughness of the carbon black obtained.

$$RF = S_{BET} - 28710/D_a + 1450 \tag{1}$$

Likewise, the aggregate factor (AF) is defined by the following equation (2), and is an index showing the degree of aggregation of the carbon black thus obtained.

$$AF = AV_{Hg} + 14 \times D_a - 290 \tag{2}$$

In the present invention, the carbon black has the above-mentioned physical properties which make both the RF value and the AF value negative values. Preferably, the carbon black has an area average diameter ($D_a$), a specific surface area ($S_{BET}$) and a pore volume ($AV_{Hg}$) which make the RF value to a level of at most −50, more preferably at most −80, and the AF value to less than 0 and at least −50, more preferably within a range of from −40 to −5.

If the RF value is positive, the blackness and the color tone of the carbon black will be inadequate, and if the AF value is positive, the dispersibility will be poor, such being undesirable.

The area average diameter ($D_a$), specific surface area ($S_{BET}$) and pore volume ($AV_{Hg}$) in the present invention are measured by the following methods. (1) Area average diameter ($D_a$).

This is measured by an electron microscopic photograph. Carbon black is introduced in chloroform, and dispersed by applying a supersonic wave of 200 KHz for 20 minutes, and the dispersed sample was fixed on a supporting membrane The fixed sample was observed and photographed by an electron microscope, and the area average particle size ($D_a$) was calculated and represented by m$\mu$m. (2) Specific surface area ($S_{BET}$)

By using a low temperature nitrogen absorption apparatus (Sorptomatic-1800, manufactured by Caluro Elba Company, Italy), the absorption of nitrogen by carbon black was measured by a low temperature nitrogen absorption method, and the specific surface area was calculated from the measured values by a multipoint method in accordance with the BET formula and represented by m$^2$/g. (3) Pore volume By using a mercury injection type pore measuring apparatus (Autopore-9200, Micrometric Company, U.S.A.), the pore volume was measured within a range of pore radius of from 15 to 1,500,000 Å, and represented by cc/100 g.

Now, in order to produce carbon black having the above-mentioned physical properties in the present invention, a reaction system is required which comprises a first zone where an oxygen-containing gas and a fuel are mixed, and a high temperature combustion gas is formed, and a second zone located at a down-stream of the first zone, where a hydrocarbon starting material is jetted and introduced from a burner provided in parallel with or in a transverse direction to the high temperature combustion gas stream thus obtained, to subject the hydrocarbon starting material to thermal decomposition and/or incomplete combustion to form carbon black, and then the carbon black-forming reaction is terminated.

In the first zone, a high temperature energy required for the formation of carbon black in the second zone, is formed as a high temperature combustion gas stream. It is preferred to form the high temperature combustion gas stream in such a manner that the remaining oxygen is as little as possible.

Specifically, the temperature of the high temperature combustion gas stream is limited usually to a level of not higher than about 2000° C. to protect the refractory bricks, and in order to control the surface roughness of the carbon black obtained in the second zone, it is desired to bring the oxygen concentration in the high temperature atmosphere substantially to 0. Therefore, the amount of oxygen supplied is controlled to be just enough for complete combustion of the fuel by taking into consideration the volume of the combustion chamber or the method of combustion or by adjusting the oxygen-containing gas temperature.

In the second zone, the supplied hydrocarbon starting material is thoroughly thermally decomposed and/or incompletely burned to form carbon black.

The temperature in the second zone gives a substantial influence over the particle size and specific surface area of the carbon black thereby obtained. In particular, in order to obtain the carbon black of the present invention, a high temperature is required, and therefore the temperature in the second zone is maintained usually at a level of from 1700° to 1980° C., preferably from 1750° to 1970° C., more preferably from 1800° to 1950° C.

Further, in the second zone, a constricted portion is provided to make a high temperaure gas stream formed by the high temperature combustion gas stream and the hydrocarbon starting material, a turbulent stream. In order to obtain carbon black having the properties as specified in the present invention, the thermal decomposition or incomplete combustion of the hydrocarbon starting material is required to be completed in a very short period of time, and the flow rate of the high temperature gas stream at the outlet of the above-mentioned constricted poriton is usually within a range of from 350 to 650 m/sec.

When the ratio of the diameter of the constricted poriton to the diameter of the combustion chamber in the first zone is taken as a constriction ratio of the constricted portion, such a constriction ratio is preferably from ¼ to ⅛, more preferably from 1/5 to 1/7.7, more preferably from 1/6 to 1/7.5. The purpose is to supply the high temperature combustion gas produced in the first zone as efficiently as possible, as the thermal and kinetic energies required for the combustion of the hydrocarbon starting material to carbon black.

Further, in order to accomplish the object of the present invention, it is preferred to adjust the above-mentioned constriction ratio to be small as the high temperature combustion gas volume per unit time increases.

The second zone is meant for a zone from the introduction of the hydrocarbon starting material to the high temperature combustion gas stream formed in the first zone to the termination of the carbon black-forming reaction. In the present invention, the retention time of the high temperature gas stream in such a second zone is adjusted preferably within a range of from 1 to 40 milliseconds, more preferably from 5 to 35 milliseconds, especially from 10 to 30 milliseconds.

The termination of the reaction is conducted by spraying water by means of e.g. a cooling water spray, to efficiently cool the high temperature gas stream to a level of at most 800°–1000° C. The cooled gas stream containing carbon black is treated in a usual method wherein it is introduced via a flue into a cyclone or into a collection bag filter, whereby the carbon black is separated from the gas and recovered.

The recovered carbon black may be subjected to treatment such as oxidation depending upon the particular purpose. In such treatment, the carbon black produced by the present invention is highly reactive and basically superior in the morphology, and thus can be made a carbon material having a high added value.

The preparation of the high temperature combustion gas stream in the first zone to be used in the process of the production of carbon black according to the present invention, is carried out by mixing a gaseous or liquid hydrocarbon fuel with air, oxygen or a mixture thereof as the oxygen-containing gas, followed by combustion. As the fuel, hydrogen, carbon monoxide, methane, natural gas, coal gas, petroleum gas, a petroleum-base liquid fuel such as kerosine, gasoline or heavy oil, or a coal-base liquid fuel such as creosote oil, naphthalene oil or carboxylic acid oil, may suitably be employed.

As the hydrocarbon starting material, an aromatic hydrocarbon such as benzene, toluene, xylene, naphthalene or anthracene, a coal-base hydrocarbon such as creosote oil, anthracene oil or carboxylic acid oil, a petroleum-base heavy oil such as ethylene heavy end oil or FCC oil, an acetylene-type unsaturated hydrocarbon, an ethylene-type hydrocarbon such as ethylene or propylene, or an aliphatic hydrocarbon such as pentane or hexane, may suitably be employed.

In the present invention, carbon black having the properties which make both the RF value and the AF value represented by the above-mentioned equations (1) and (2), negative values, is high-quality coloring carbon black which exhibits excellent blackness, gloss and dispersibility when incorporated as a pigment into a rubber, a paint, a lacquer, an ink or a resin. Such carbon black can be industrially advantageously produced by adjusting the reaction temperature to a level of from 1700° to 1980° C., the flow rate at the constricted portion to a level of from 350 to 650 m/sec, and the retention time from the nozzle for introducing the hydrocarbon starting material to the cooling water spray portion for terminating the reaction to a level of from 1 to 40 milliseconds.

Now, the present invention will be described in further detail with reference to Examples. However, it should be understood that the present invention is by no means restricted to such specific Examples.

EXAMPLES 1 to 4

By using a carbon black producing furnace having a structure as shown in FIG. 1, 220 Nm³/hr of the fuel as identified in Table 3 and 1050 Nm³/hr of an air for combustion, are supplied from a fuel supply nozzle 10 to a combustion chamber 2 of the furnace, and burned. Into the high temperature combustion gas stream thus obtained, a hydrocarbon starting material as identified in Table 2 was supplied at a rate as shown in Table 1 from a starting material supply nozzle 5 to form carbon black in the second zone 4, and then cooling water was sprayed from a water spray 11 for termination of the reaction so that the retention time from the hydrocarbon starting material supply nozzle to the water spray for the termination of the reaction was maintained to be the value as shown in Table 1. Further, the carbon black cooled by the water spray for cooling, was collected by a cyclone and/or a bag filter, and the particle size, specific surface area and pore volume were measured. The results thereby obtained are shown in Table 1.

Comparative Examples 1 to 2

Carbon black was prepared in the same manner as in the Examples except that the conditions were changed as identified in Table 1. The physical properties of the carbon black thus obtained were measured. The results are shown in Table 1.

Comparative Examples 3 to 7

The physical properties of commercially available high-quality coloring carbon blacks, were measured. The results are shown in Table 1.

The method for measuring the resin properties in the Examples and Comparative Examples, was as follows.

Method for evaluating the resin properties

A polyvinyl chloride blend having the following composition was mixed at 130° C. for 10 minutes by a kneader.

| | |
|---|---|
| Polyvinyl chloride resin | 100 parts by weight |
| Plasticizer | 40 parts by weight |
| Antioxidant | 2 parts by weight |
| Thermal stabilizer | 0.2 parts by weight |
| Lubricant | 0.5 parts by weight |

To the above blend, 0.2% by weight of carbon black was added and dispersed by a shaker, and the mixture was kneaded by a pair of heated rolls, and pressed by a pressing machine to obtain a sheet sample. The blackness and color tone of the sheet sample were evaluated by visual observation. Further, this sample was cut into a super thin piece having a thickness of 2 μm by a microtome (manufactured by Leiz), and the dispersibility was evaluated by an optical microscopic method (Leigh-Dugmore method).

The evaluation standards for the color tone and the dispersion in Table 1, were as follows:
Color tone:
 O . . . bluish black
 Δ . . . slightly reddish black
 X . . . reddish black
Dispersion:
 10+ means from 10.2 to 10.3, and
 10− means from 9.7 to 9.8.

TABLE 1

| | | Experimental conditions | | | | Physical properties | | | | | Resin properties | | |
|---|---|---|---|---|---|---|---|---|---|---|---|---|---|
| | | Starting material supply rate (kg/hr) | Reaction temperature (°C.) | Flow rate at constricted portion (m/B) | Retention time (milli-sec.) | Da (mμm) | $S_{BET}$ (m²/g) | $AV_{Hg}$ (cc/100 g) | RF | AF | Black-ness | Dis-persi-bility | Color tone |
| Example 1 | Experiment | 55 | 1900 | 507 | 19 | 14.0 | 510 | 75 | −91 | −19 | 31 | 10 | O |
| Example 2 | Experiment | 60 | 1870 | 500 | 20 | 15.0 | 412 | 68 | −52 | −12 | 31 | 10− | O |
| Example 3 | Experiment | 50 | 1950 | 517 | 19 | 13.5 | 542 | 84 | −135 | −17 | 31 | 10 | O |
| Example 4 | Experiment | 46 | 1970 | 522 | 25 | 10.8 | 580 | 119 | −628 | −20 | 32 | 10 | O |
| Comparative Example 1 | Experiment | 50 | 1950 | 517 | 42 | 13.8 | 580 | 98 | −66 | 1 | 29 | 9 | X |
| Comparative | Experiment | 80 | 1780 | 480 | 44 | 17.0 | 295 | 52 | 56 | 0 | 26 | 8+ | Δ |

TABLE 1-continued

| | | Experimental conditions | | | | Physical properties | | | | | Resin properties | | |
| --- | --- | --- | --- | --- | --- | --- | --- | --- | --- | --- | --- | --- | --- |
| | | Starting material supply rate (kg/hr) | Reaction temperature (°C.) | Flow rate at constricted portion (m/B) | Retention time (milli-sec.) | Da (mμm) | $S_{BET}$ (m²/g) | $AV_{Hg}$ (cc/100 g) | RF | AF | Black-ness | Dis-persi-bility | Color tone |
| Example 2 | | | | | | | | | | | | | |
| Comparative Example 3 | Commercial Product (Furnace method) | — | — | — | — | 15.0 | 564 | 87 | 100 | 7 | 28 | 9 | × |
| Comparative Example 4 | Commercial Product (Furnace method) | — | — | — | — | 18.0 | 643 | 109 | 498 | 71 | 23 | 10⁺ | Δ |
| Comparative Example 5 | Commercial Product (Furnace method) | — | — | — | — | 18.0 | 887 | 96 | 742 | 58 | 21 | 10 | Δ |
| Comparative Example 6 | Commercial Product (Roller method) | — | — | — | — | 15.4 | 516 | 172 | 102 | 98 | 25 | 11 | ○ |
| Comparative Example 7 | Commercial Product (Furnace method) | — | — | — | — | 17.6 | 261 | 44 | 80 | 0 | 27 | 8⁻ | × |

TABLE 2

| Composition of fuel (coal gas) | |
| --- | --- |
| | (volume %) |
| $CO_2$ | 2.3 |
| CnHm | 3.4 |
| CO | 6.5 |
| $H_2$ | 54.0 |
| $CH_4$ | 28.6 |
| $N_2$ | 5.2 |

TABLE 3

| Properties of hydrocarbon starting material | |
| --- | --- |
| Name: | Creosote oil |
| Elemental analysis: | Carbon 91.0 (% by weight) |
| | Hydrogen 5.9 (% by weight) |
| Average boiling point: | 335 (°C.) |
| Specific gravity: | 15/4° C.: 1.11 |

We claim:

1. High-quality coloring carbon black having a specific surface ara ($S_{BET}$), an area average diameter ($D_a$) and a pore volume ($AV_{Hg}$) which make both the roughness factor (RF) and aggregate factor (AF) as calculated by the following equations, negative values:

$$RF = S_{BET} - 28710/(D_a) + 1450$$

$$AF = AV_{Hg} + 14 \times (D_a) - 290$$

where $S_{BET}$ is the specific surface area (m²/g) of the carbon black as measured by a BET nitrogen absorption method, $D_a$ is the area average diameter (m μm) of the carbon black as measured by an electron microscopic measuring method, and $AV_{Hg}$ is the pore volume (cc/100 g) of the carbon black as measured by a mercury porosimeter, provided $D_a$ is at most 17 mμm.

2. The carbon black according to claim 1, wherein RF is at most −50 and AF is less than 0 and at least −50.

3. The carbon black according to claim 1, wherein RF is at most −80 and AF is within a range of from −40 to −5.

4. The carbon black according to claim 3, wherein $D_a$ is at most 15 mμm.

* * * * *